(12) United States Patent
Brochonski et al.

(10) Patent No.: US 11,799,891 B2
(45) Date of Patent: Oct. 24, 2023

(54) COMPUTER-IMPLEMENTED METHOD OF DETECTING ABNORMAL EVENTS IN A TELECOMMUNICATION SYSTEM AND TELECOMMUNICATION SYSTEM

(71) Applicant: Unify Patente GmbH & Co. KG, Munich (DE)

(72) Inventors: Michael Brochonski, Curitiba (BR); Vitor Monteiro, São Paulo (BR)

(73) Assignee: Unify Patente GmbH & Co. KG, Munich (DE)

( * ) Notice: Subject to any disclaimer, the term of this patent is extended or adjusted under 35 U.S.C. 154(b) by 495 days.

(21) Appl. No.: 17/118,689

(22) Filed: Dec. 11, 2020

(65) Prior Publication Data
US 2021/0182173 A1  Jun. 17, 2021

(30) Foreign Application Priority Data

Dec. 13, 2019  (EP) .................................. 19 215 948

(51) Int. Cl.
| | |
|---|---|
| *G06F 11/34* | (2006.01) |
| *H04L 9/40* | (2022.01) |
| *G06F 40/284* | (2020.01) |
| *G06F 9/54* | (2006.01) |
| *G06F 18/213* | (2023.01) |
| *G06F 18/214* | (2023.01) |
| *G06N 3/044* | (2023.01) |

(52) U.S. Cl.
CPC .......... *H04L 63/1425* (2013.01); *G06F 9/542* (2013.01); *G06F 11/3476* (2013.01); *G06F 18/213* (2023.01); *G06F 18/214* (2023.01); *G06F 40/284* (2020.01); *G06N 3/044* (2023.01)

(58) Field of Classification Search
CPC .... G06F 11/3476; G06F 18/214; G06N 3/044
See application file for complete search history.

(56) References Cited

U.S. PATENT DOCUMENTS

| | | | |
|---|---|---|---|
| 10,848,508 B2* | 11/2020 | Chen | G06F 18/2155 |
| 2019/0260778 A1 | 8/2019 | Chen et al. | |
| 2019/0354457 A1* | 11/2019 | Urmanov | G06F 16/353 |
| 2020/0195683 A1* | 6/2020 | Kuppa | H04L 63/1441 |

OTHER PUBLICATIONS

European Search Report for European Patent Application No. 19215948.1 dated Jun. 9, 2020.
Weixi Li: "Automatic Log Analysis using Machine Learning Awesome Automatic Log Analysis Version 2.0"; dated Nov. 2013 (XP055402266).

* cited by examiner

*Primary Examiner* — Nadeem Iqbal
(74) *Attorney, Agent, or Firm* — Buchanan Ingersoll & Rooney PC

(57) ABSTRACT

A computer-implemented method of detecting abnormal events in a telecommunication system can include a training phase and a production phase. The training phase can include recording data events in a log file during the execution of the system and creating a standard for the data events representing a properly working environment of the telecommunication system by applying a training procedure. The production phase can include receiving at least one new data event and determining whether the at least one new data event is a normal event that matches the standard or not. If the at least one new data event matches the standard, it can be used for updating the standard. If the at least one new data event does not match the standard, it can be classified and reported as at least one an abnormal event.

20 Claims, 1 Drawing Sheet

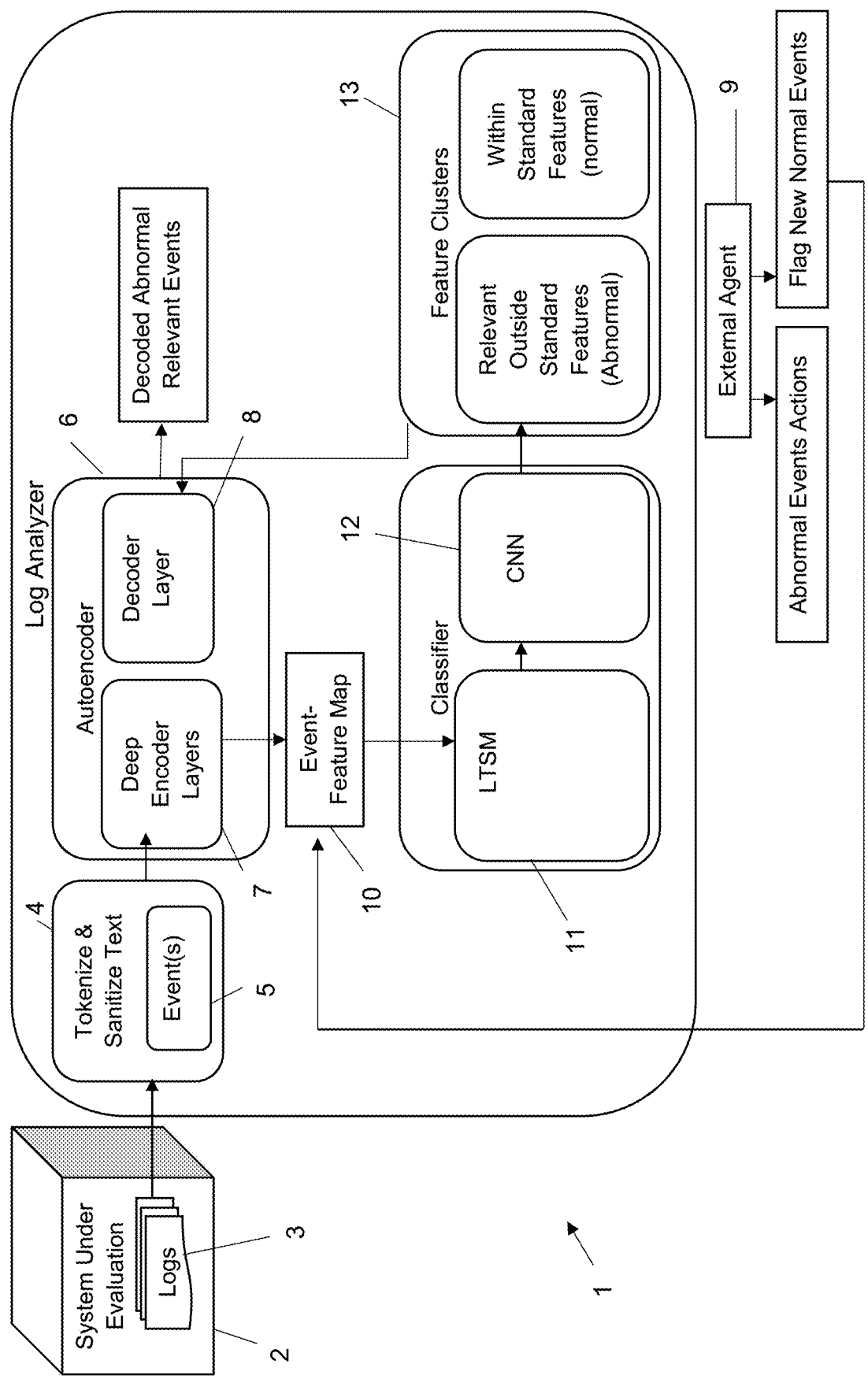

COMPUTER-IMPLEMENTED METHOD OF DETECTING ABNORMAL EVENTS IN A TELECOMMUNICATION SYSTEM AND TELECOMMUNICATION SYSTEM

CROSS-REFERENCE TO RELATED APPLICATIONS

This patent application claims priority to European Patent Application No. 19 215 948.1, filed on Dec. 13, 2019. The entirety of this patent application is incorporated by reference herein.

FIELD

The present innovation relates to a computer-implemented method of detecting abnormal events in a telecommunication system as well as to a telecommunication system for carrying out the method and telecommunication devices that may be components of embodiments of the system.

BACKGROUND

Modern communication systems and applications, known from prior art, tend to generate copious amounts of operation logs. Due to the amount of information, lack of standard and general knowledge to interpret the information contained in these logs, a lot of expertise is needed for the analysis and evaluation. However, this is not only time-consuming, but it also requires a lot of resources, since specialists are needed to do the analysis.

SUMMARY

We have determined that, on properly working environments, the logs usually display a known pattern of events. However, even with complex knowledge, it may be difficult for a specialist in this field to identify discrepant information that reflects an abnormality in the working environment. Therefore, errors may occur, since they are nearly impossible to be detected by human observation alone.

Therefore, embodiments of the present invention can be based on an objective to provide a telecommunication system and a computer-implemented method of detecting abnormal events in a telecommunication system that facilitate the work of an expert analyzing logs in log files so as to resolve abnormal events in telecommunication systems.

In some embodiments of our computer-implemented method of detecting abnormal events in a telecommunication system, the method can include a training phase and a production phase, wherein in the training phase, the method comprises the steps of: (a) recording data events in a log file during the execution of the system; (b) creating a standard for the data events representing a properly working environment of the telecommunication system by applying a training procedure, wherein the properly working environment is characterized by a plurality of features, and a predetermined order of the features, wherein data events stored in a set of representative random samples of the stored log files are used for the training procedure; and wherein the production phase comprises the steps of: (i) receiving at least one new data event; and determining, whether the at least one new data event is a normal event that matches the standard, and (ii) if the at least one new data event matches the standard, using it for updating the standard, and if the at least one new data event does not match the standard, classifying and reporting it as an abnormal event.

Thus, according to embodiments of the inventive method, the number of logs that a specialist has to deal with can be substantially reduced. All data events can be detected and filtered so that only the abnormal events are transmitted further to a specialist to deal with the event, while normal events are used to keep the standard updated. Therefore, a specialist does not have to go through the log files himself; rather he or she only needs to take care of the abnormal events that are transmitted, thereby facilitating his work and making it more efficient. Also, by this automatic detection and filtering mechanism, errors may be prevented more reliably.

According to a preferred embodiment of the invention, a log analyzer can be used for the training phase and/or in the production phase for receiving at least one log file output from the telecommunication system to be evaluated.

According to a further preferred embodiment of the invention, the method can also include a step of extracting the at least one event from the log files.

According to still a further preferred embodiment of the invention, the method further comprises a step of tokenizing information of the at least one event.

Moreover, according to yet another preferred embodiment of the invention, the method comprises a step of transmitting the at least one event to an autoencoder unit. The autoencoder unit can include an encoder and a decoder. Preferably, the encoder is a series of stacked encoders with multiple layers, in particular, a deep encoder. Also preferably, the decoder has one layer for decoding features from the at least one event into a format that is readable by a human. According to another preferred embodiment of the invention, the deep encoder transforms the at least one data event from a high-dimensional space into a series of codes in a low-dimensional space.

Also, the method may further comprise a step of feeding the encoded data events to a Long Short-Term Memory ("LSTM").

Still further, the method may comprise a step of feeding the encoded data events to a Convolutional Neural Network ("CNN"), for classifying the at least one data event as a standard normal event or as an abnormal event that is a relevant event outside of the standard. Preferably, only data events that are categorized as an abnormal events are decoded by the decoder.

According to another preferred embodiment of the invention, the method further comprises a step of forming clusters of features that are classified by the CNN under the same class. Moreover, the at least one data event may be transcribed into features that describe the telecommunication system to be evaluated.

Further, according to the present invention, a telecommunication system is provided comprising a log analyzer that is adapted to carry out the method of detecting abnormal events in the telecommunication system. In some embodiments, the log analyzer can be an application stored in non-transitory memory of a computer device of the system that is connectable to a network or can be a particular computer device of the telecommunication system (e.g. a log analyzer server having at least one processor connected to a non-transitory memory and at least one transceiver). According to a preferred embodiment, the log analyzer comprises an autoencoder unit comprising a deep encoder and a decoder.

Further advantages of the inventive method and system are that due to the grouping of features into clusters that represent as issues or expected behavior of the system under evaluation, the system is more flexible compared to systems that use pre-defined error clusters. Among these clusters, normal behavior, warning, errors, and unexpected behavior of the system under evaluation may be defined. Thus, flexibility is added to the log analyzer when encountering new issues or a different expected behavior, as the system adapts to these new situations.

Also, since the telecommunication system does not need the time elapsed between the recorded data events, but rather only considers the order and context of the data events for generating a feature cluster, again, flexibility is added on tackling complex log patterns that depend on asynchronous events comping from external subsystems, e.g., allowing for delays due to network, disk access, human interaction, etc. Tolerance to time and pattern variations ensure a larger delay allowance for classifying events correctly. In short, data events that would not be recognized as normal events due to their dependence on time variance may be recognized by the inventive solution.

Further, using a deep autoencoder that has the characteristic of condensing data and assigning a weight to each parameter provides several advantages. Namely, as data is condensed, meaning that the context in the log events is maintained up to a certain boundary, it may be represented in a lower dimension. Thus, high dimensional data may be represented on a lower dimension. This facilitates the learning process of the LSTM and CNN stage, as it presents features and weighs the values of each parameter that otherwise would not be present when employing simple tokenization. The deep autoencoder considerably reduces the amount of training data required to learn some functions.

Also, as the data is condensed, training of the LSTM and CNN stage with logs from complex systems is less prone to saturation or reaching a limit while learning new features. This means that no more modules of further scalation of the system is directly needed. This saves computing resources and processing from scaling the telecommunication system due to learning restrictions.

The invention and embodiments thereof will be described below in further detail in connection with the drawing. For instance, other details, objects, and advantages of the apparatus, method, and system will become apparent as the following description of certain exemplary embodiments thereof proceeds.

BRIEF DESCRIPTION OF THE DRAWINGS

Exemplary embodiments of an apparatus and system for detecting abnormal events in a telecommunication system and/or analyzing those events and methods of making and using the same are shown in the drawings included herewith. It should be understood that like reference numbers used in the drawings may identify like components.

FIG. 1 is a block diagram of a log analyzer according to an embodiment of the invention illustrating implementation of an exemplary embodiment of a method for detecting abnormal events in a telecommunication system.

Reference numerals used in the drawings include the following:
1 log analyzer;
2 telecommunication system under evaluation;
3 logs block (e.g. at least one log file);
4 tokenize and sanitize text block;
5 event(s) block;
6 autoencoder;
7 deep encoder layers (e.g. layers of at least one encoder);
8 decoder layer (e.g. at least one layer of a decoder);
9 external agent;
10 event feature map block (which can provide feature extraction);
11 LSTM block;
12 CNN block; and
13 feature clusters block.

DETAILED DESCRIPTION

FIG. 1 is a block diagram of a log analyzer 1 according to an embodiment of the invention. The data flow concerning this embodiment, at first, may be summarized as follows. First, the system under evaluation has a set of logs that is going to be used for training. Then, in a subsequent step referred to as tokenization & sanitization, a decision is made what is going to be an unitary event; this may vary from system to system, as it may be a simple string, a message several lines long, or a single line. Further, in this step, unwanted characters are removed. Subsequently, so-called events are input into the deep encoder, and an event-feature map is obtained after training. Then, the features are input into a classifier block, first through an LTSM block and then through an CNN block, as will be outlined in further detail with reference to FIG. 1 below. Next, a feature cluster is received as an output. During the training phase all the feature cluster entries have to be decoded by means of the decoder layer of the autoencoder, as it is still unknown which ones are the normal events and which ones are abnormal events. It is noted that this has to be evaluated by an external agent 9, and this procedure will be a little bit different in the production phase, as here, only the abnormal events are of interest, so only these will be decoded. Further, it is noted that there are two different kinds of abnormal event, namely, an event which requires actions to be taken for or a new event that is normal. However, at its first appearance on the system, it will be flagged as abnormal. In these cases the external agent 9 must flag it as a normal event so it would not be warned as an abnormal event when it appears again, this event is then fed again into the classifier block via the Long-Short Term Memory Network (LTSM).

In the following, the procedure will be explained in detail with reference to the several blocks of the block diagram shown in FIG. 1. Here, in a first step, in the system under evaluation 2 (e.g. a communication system having one or more computer devices or communication devices that generate logs relating to the performance of the system), several log outputs are supplied to the log analyzer 1 either in the initial training phase or during the production phase, which is indicated as the first block of logs 3. Subsequently, as indicated by the second block, tokenize and sanitize text 4, of the block diagram, data events are extracted from the log outputs whereby after undesired characters have been removed from the text in a sanitizing procedure, the data is tokenized according to known relevant information as, for example, standard headers, expected date and time format.

The next block, events 5, indicates "events". An event in this context can be understood as something that may be added as a unitary input to the autoencoder after the tokenization and sanitization process. In particular, an event may represent a unit of information which, for example, in a text would be either a phrase, a sentence, or a paragraph.

Then, the thus processed events data is supplied to an autoencoder 6. One of the characteristics of the autoencoder 6 is that no manually pre-classified or pre-labeled events are needed. This plasticity is useful for the function of the log analyzer 1, since it ensures that features of the data events stored in the log files may be extracted in an automated manner, not depending on manual techniques or overly specialized techniques for feature extraction in each system which may be monitored by the log analyzer 1 according to this embodiment. Basically, the autoencoder 6 comprises at least one encoder 7 and at least one decoder 8. The encoder 7 of this embodiment actually is a series of stacked encoders, with multiple layers, denominated as deep encoder and further described below. It can be responsible for extracting the features of the data events automatically. The decoder 8 has a single layer for decoding features of the data events into simplified events that may be analyzed by an external agent 9. Namely, the decoder 8 has the task of reconstructing simplified events from the corresponding features. The reconstructed simplified event contains only the relevant information extracted by the tokenize and sanitize text block 4 and processed by the encoder 7. This is necessary for the features to be converted in a human readable format so that the external agent 9 may be able to analyze the output concerning abnormal events for the system under evaluation 2. It is noted that the external agent 9 is responsible for defining which features or feature cluster is actually is an issue to be resolved and he or she is also responsible for taking the necessary steps for resolving the issue, after it has been detected. It is also noted that other embodiments can utilize a decoder layer that includes more than one decoder.

As mentioned above, the deep encoder 7 is a series of stacked encoders, and is responsible to generate features from the data events. The deep encoder layer network of the log analyzer 1 transforms input data events from a high-dimensional space into a series of codes into a low-dimensional space containing the information considered to be relevant, the extracted features that are code vectors with relevant information extracted from the data events, as indicated in the Event Feature Map block 10 of the block diagram of FIG. 1. In short, the input of the encoder 7 may be regarded as one or more set of points in a multidimensional space, analogous to a nonlinear function that transforms it into data in a lower dimensional code vector. This code vector has most of the relevant information of the input data so as to be able to reconstruct its main features.

Subsequently to the "feature extraction" stage 10 mentioned above, there is a Long Short-Term Memory (LSTM) stage 11, which basically serves two main goals on the proposed log analyzer 1:
  (1) After low occurrence events have been transcribed into features by the encoding layer 7 of the autoencoder 6, they tend to lose weighted value while training on the CNN stage. However, the LSTM 11 attenuates this effect by balancing weight of low occurrence events and high frequency events.
  (2) It also will prevent data overfitting, when trying to encompass too many events transcribed under the same feature cluster. This may happen especially when data events that are abnormal are considered as being standard ones.

The next stage of the block diagram is the CNN block 12. The CNN uses the features extracted in the Event Feature Map block 10 by the encoding layer 7 of the autoencoder 6. This stage of the system is able to consider the expected order in which the features occur, that is, the order is considered along with features, but it is not a rigid parameter. As order is a parameter with a certain degree of flexibility, this enables different order patterns to be identified, adapting also to these new patterns.

Input data is classified by following a series of steps while going through the layers of the CNN 12, namely:

one-dimensional convolving filters act as n-tuple detectors, each filter specializes in a close-related family of n-tuples;
  max-pooling extracts relevant n-tuples over time, used for future decisions;
  the output layer classifies the n-tuples based on the information from the previous steps after training the CNN outputs, a set of classifications on its output layer, as feature clusters.

The feature clusters block 13 indicates the feature clusters. These are clusters of features classified under the same class by the CNN 12. Feature clusters may be further categorized after initial training, under two main groups:
  within the standard: they are the expected ones, considered as a normal content of the log files.
  outside of the standard: they are the ones considered as issues in the log files and that should be reported, to be determined by an external agent 9.

It is noted that whether a feature is an outside standard one that needs to be evaluated by the external agent 9 is defined after the training phase and during production when a new feature is detected.

Further, as the above described embodiment of a log analyzer 1 makes use of machine learning techniques to solve the problem, data events stored in a representative random sample of past logs are used for training to create a standard with the expected features and their order.

After the training phase new events are supplied into the system to determine whether their features are contained in the standard. On its output it delivers the potential abnormal events in a comprehensible and concise manner, as outlined above.

As this is a continually reinforced learning system, new events considered within the standard may be used as training events to keep the system updated. Otherwise they are considered as abnormal events and need to be reported and analyzed by an external agent 9. This agent 9 is responsible to determine whether the event is to be considered an issue or a new acceptable one and reinforced into the system, as mentioned above.

In general, in the initial step, a set of representative random samples of past logs is used to generate the standard set of features, and after relevant information of the logs is comprised in the standard, the system is ready for use. Afterwards, new events are input into the system and compared against the standard and divided into two categories:
  normal events that closely match the known standard features;
  abnormal events that are lying outside of the known standard features.

Normal events are fed back into the system to ensure the standard features are flexible enough and conform to small variations, avoiding overfitting when analyzing events, whereas abnormal events are sent to an external agent 9 for analysis, as already outlined above. If they are considered as being normal events, for example, due to a new implemented process in the system under evaluation 2, they are fed back into the log analyzer 1. Otherwise, they are reported as an issue that must be tackled.

It should be appreciated that modifications to the embodiments explicitly shown and discussed herein can be made to meet a particular set of design objectives. For instance, the log analyzer 1 can be a server of a communication system that has an application stored in its non-transitory memory that is run by a processor of the server to perform an embodiment of the event detection and/or analyzation method. Such a server can be communicatively connected to at least one other network device to receive logs of a system that is to be evaluated. In yet other embodiments, the log analyzer 1 can be another type of communication device connectable to at least one system of a telecommunication network for evaluation of that system. A gateway, access point, router, or other type of network node can be utilized to facilitate the communication connection between at least one device of the at least one communication system to be evaluated and the log analyzer 1 for receiving of one or more logs 3 and evaluation of the one or more logs 3 to detect one or more events and analyze them. It should also be appreciated that the one or more devices of the one or more communication systems can be machines, such as a server or other type of computer device. As yet another example, its should be appreciated that the abnormal events actions can include the log analyzer providing data to a communication device of an agent communicatively connected to the log analyzer 1 so that a visual display and/or audio display of data is provided to the agent about the abnormal event via at least one output device or input/output device of the agent's communication device (e.g. touch screen, display, speaker, etc.). The agent may provide input for flagging new normal events or addressing any abnormal events by use of one or more input devices of the agent's communication device (e.g. pointer device, keyboard, etc.).

As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of the telecommunication apparatus and telecommunication system and methods of making and using the same have been shown and described above, it is to be distinctly understood that the invention is not limited thereto but may be otherwise variously embodied and practiced within the scope of the following claims.

What is claimed is:

1. A computer-implemented method of detecting abnormal events in a telecommunication system, the method comprising a training phase and a production phase, wherein in the training phase, the method comprises:
   recording data events in a log file during the execution of the system;
   creating a standard for the data events representing a properly working environment of the telecommunication system by applying a training procedure;
   wherein the properly working environment is characterized by a plurality of features and a predetermined order of the features, wherein data events stored in a set of representative random samples of stored log files are used for the training procedure;
   wherein the production phase comprises the steps of
   receiving at least one new data event;
   encoding the at least one new data event via at least one encoder;
   feeding the encoded at least one new data event to a Convolutional Neural Network (CNN) for classifying the at least one new data event as a standard normal event or as an abnormal event that is an event outside of the standard; and
   determining whether the at least one new data event is a normal event that matches the standard, and upon a determination that the at least one new data event matches the standard, using it for updating the standard, and upon a determination that the at least one new data event does not match the standard, classifying and reporting it as an abnormal event so that only the new data events that are categorized as an abnormal event are decoded by the decoder.

2. The method according to claim 1, wherein a log analyzer is used for the training phase and/or in the production phase for receiving at least one log file output from the telecommunication system to be evaluated.

3. The method according to claim 1 comprising:
   extracting the at least one event from the log files.

4. The method of claim 1, comprising:
   tokenizing information of the at least one new data event.

5. The method according to claim 4, comprising:
   transmitting the tokenized information of the at least one new data event to an autoencoder unit, the autoencoder unit comprising the at least one encoder and the at least one decoder.

6. The method according to claim 5, wherein the at least one encoder is a series of stacked encoders with multiple layers or a deep encoder.

7. The method according to claim 5, wherein the at least one decoder has one layer for decoding features from the at least one event into a format that is readable by a human.

8. The method according to claim 1, wherein the at least one encoder encodes the at least one new data event to transform the at least one new data event from a high-dimensional space into a series of codes in a low-dimensional space.

9. The method of claim 8, comprising:
   feeding the encoded at least one new data event to a Long Short-Term Memory (LSTM).

10. The method according to claim 1, comprising:
    the CNN performing one-dimensional filtering and max-pooling of extracts of n-tuples for classifying the n-tuples as feature clusters for forming clusters of features that are classifiable under a same class by the CNN.

11. The method of claim 10, wherein the feature clusters include multiple groups of features that includes features within the standard and features that are outside the standard.

12. A computer-implemented method of detecting abnormal events in a telecommunication system, the method comprising a training phase and a production phase, wherein in the training phase, the method comprises:
    recording data events in a log file during the execution of the system;
    creating a standard for the data events representing a properly working environment of the telecommunication system by applying a training procedure;
    wherein the properly working environment is characterized by a plurality of features and a predetermined order of the features, wherein data events stored in a set of representative random samples of stored log files are used for the training procedure;
    wherein the production phase comprises the steps of
    receiving at least one new data event; and
    determining whether the at least one new data event is a normal event that matches the standard, and upon a determination that the at least one new data event matches the standard, using it for updating the standard, and upon a determination that the at least one new data event does not match the standard, classifying and reporting it as an abnormal event;
    tokenizing information of the at least one new data event;

transmitting the tokenized information of the at least one new data event to an autoencoder unit, the autoencoder unit comprising at least one encoder and at least one decoder, the at least one encoder comprising a series of stacked encoders with multiple layers or a deep encoder; wherein the at least one encoder encodes the at least one new data event to transform the at least one new data event from a high-dimensional space into a series of codes in a low-dimensional space;

feeding the encoded at least one new data event to a Long Short-Term Memory (LSTM);

feeding the encoded at least one new data event to a Convolutional Neural Network (CNN) for classifying the at least one new data event as a standard normal event or as an abnormal event that is an event outside of the standard, wherein only the new data events that are categorized as an abnormal event are decoded by the decoder; and forming clusters of features that are classified by the CNN under a same class.

13. The method of claim 12, wherein in the training phase, the at least one data event is transcribed into features that describe the telecommunication system to be evaluated.

14. A telecommunication system comprising a log analyzer, the log analyzer configured to:

detect abnormal events in the telecommunication system, the log analyzer configured to:

receive data events recorded in at least one log file during operation of the telecommunication system;

create a standard for the data events of the at least one log file representing a properly working environment of the telecommunication system by applying a training procedure;

wherein the properly working environment is characterized by a plurality of features and a predetermined order of the features, wherein data events stored in a set of representative random samples of the at least one log file are used for the training procedure;

the log analyzer also configured to receive at least one new data event to feeding an encoded version of the at least one new data event to a Convolutional Neural Network (CNN) for classifying the at least one new data event as a standard normal event or as an abnormal event that is an event outside of the standard; and determine whether the at least one new data event is a normal event that matches the standard, and upon a determination that the at least one new data event matches the standard, use the at least one new data event for updating the standard, and upon a determination that the at least one new data event does not match the standard, classifying and reporting the at least one new data event as at least one abnormal event so that only the new data events that are categorized as an abnormal event are decodable by at least one decoder.

15. The telecommunication system according to claim 14, wherein the log analyzer comprises an autoencoder unit comprising a deep encoder to encode the at least one new data event for feeding the encoded version of the at least one new data event to the CNN and the at least one decoder.

16. The telecommunication system of claim 14, comprising:

at least one encoder configured to encode the at least one new data event to transform the at least one new data event from a high-dimensional space into a series of codes in a low-dimensional space to form the encoded version of the at least one new data event for feeding to the CNN.

17. The telecommunication system of claim 16, wherein the CNN is configured to perform one-dimensional filtering and max-pooling of extracts of n-tuples for classifying the n-tuples as feature clusters for forming clusters of features that are classifiable under a same class by the CNN.

18. The telecommunication system of claim 17, wherein the feature clusters include multiple groups of features that includes features within the standard and features that are outside the standard.

19. The telecommunication system of claim 18, comprising a Long Short-Term Memory (LSTM) configured to balance weights for different types of events and prevent data overfitting for the CNN.

20. The method according to claim 12, wherein a log analyzer is used for the training phase and/or in the production phase for receiving at least one log file output from the telecommunication system to be evaluated.

* * * * *